United States Patent Office 3,801,531
Patented Apr. 2, 1974

---

3,801,531
PRESSURE SENSITIVE ADHESIVE COMPOSITIONS
Anthony J. Berejka, Cranford, and Leonard H. Drexler, Rahway, N.J., assignors to Esso Research and Engineering Company
No Drawing. Filed Dec. 17, 1971, Ser. No. 209,413
Int. Cl. C08c 11/28; C08d 5/02
U.S. Cl. 260—33.4 PQ
8 Claims

ABSTRACT OF THE DISCLOSURE

Pressure sensitive adhesives are made from olefinically unsaturated elastomers or blends of two or more such elastomers, containing between about 0.1 and about 3.5 mol percent of sulfo or thiouronium groups, either unneutralized, partially, or fully neutralized with organic amines or inorganic bases, which can be admixed with normally liquid, but viscous, or solid, conventional tackifiers, i.e. low molecular weight polyisobutylene, polybutenes, rosin esters, hydrogenated rosin methyl esters, petroleum resins, etc. in an amount between about 10 and about 150 phr. These adhesives can be dissolved at about 10 to about 30 wt. percent total solids in conventional organic solvents, e.g. toluene plus isopropyl alcohol, and applied to sheets or tapes of cloth, plastics, cellophane, paper, polyester films, etc. and dried to remove solvent leaving an adhesive film of 1.0 to 2.5 mils in thickness. Pressure sensitive adhesive tapes and sheetings having an excellent balance of hold and tack properties and having good resistance to cold flow are produced.

BACKGROUND OF THE INVENTION

This invention relates to the preparation of pressure sensitive adhesive compositions and to those compositions applied to various substrates for the purpose of making tapes and sheetings coated with these pressure sensitive adhesives. These adhesives are generally applied to the backings of substrates as cements. The compositions, in essence, comprise elastomers which are essentially of olefinically unsaturated nature and which are modified to the extent that sulfo or thiouronium groups are incorporated thereinto. The elastomers employed in preparing such derivatives are those such as natural rubber or the synthetic elastomers such as butyl rubber, halobutyl rubber, SBR, polyisoprene, polybutadiene or other olefinically unsaturated elastomers which are ordinarily curable by cross linking, i.e. vulcanizable, and useful in forming pressure sensitive adhesive compositions. Most generally used methods of vulcanization involve the use of sulfur coupled with various sulfur containing compounds. However, chemical vulcanization, as with peroxides, is utilized in some instances.

Sulfonic acid polymers and copolymers of such elastomers have been prepared in the past by well known methods. For example, aromatic containing polymers are sulfonated as described in U.S. Pat. 3,072,618 using a complex of a lower alkyl phosphate and sulfur trioxide. Water soluble polymers have been prepared by reacting the aromatic rings in styrene-butyl rubber graft polymers with $SO_3$ to form viscous sulfonated products as described in U.S.S.R. Pat. 211,079. The olefinically unsaturated elastomers, including natural rubber as well as the synthetic elastomers, have been sulfonated using chlorosulfonic acid with ethers and esters as described in German Pats. 58,256, 550,243, and 572,980. U.S. Pat. 3,205,285 teaches that the ability to take up dyes in the case of polypropylene fibers is enhanced by reacting the fibers with an $SO_3$ complex.

More recently sulfonated elastomers have been prepared of particular sulfo-group content by the reaction of the natural or synthetic elastomers using various complexes of $SO_3$. This is described, in detail, in pending U.S. patent application 877,849 of Canter which has issued as U.S. Pat. 3,642,728, dated Feb. 15, 1972 (equivalent to Belgian Pat. 71,861). This disclosure is incorporated herein by reference. Additionally, another method of producing the sulfonated elastomers, again of limited mole percent sulfo group content, and having unique properties, are prepared by the reaction of the olefinically unsaturated rubbers with acyl sulfates. These sulfonated elastomers differ to some extent, chemically, from those described in the last mentioned U.S. patent issued to Canter, but, in general, both types of sulfonated elastomers have been produced. Sulfonated butyl rubbers, for example, exhibit high green strength, high tensile strength, have a high water impermeability, and possess other advantageous properties not heretofore present in previously produced sulfonated elastomers. The method of preparation of these sulfonated elastomers using acyl sulfates is described in abandoned U.S. application Ser. No. 123,908 filed Mar. 12, 1971 by O'Farrell and Serniuk.

The rubbers which may be sulfonated are the olefinic and unsaturated elastomers such as butyl rubber, halogenated butyl rubber, ethylene-propylene conjugated or non-conjugated diolefin terpolymers, styrene-butadiene rubbers, polybutadiene, polyisoprene, natural rubber and the various types of heretofore well known rubbers containing either high or low olefinic unsaturation. The copolymerization of ethylene or propylene with multiolefins such as hexadiene, dicyclopentadiene, norbonodiene, methylene norbornene, ethylidene norbornene, 1,5-cyclooctadiene, etc. are useful elastomers as starting materials for sulfonation. Generally, these polymers contain between 0.2 and about 10 mole percent unsaturation. As used herein, the term "olefinically unsaturated" is not intended to refer to aromatic type unsaturation but to the aliphatic type of olefinic unsaturation. Butyl rubber and halobutyl rubber are well known articles of commerce. In general they have $\overline{M}v$ ranging between about 300,000 and 450,000. They are prepared conventionally as described in U.S. Pats. 2,356,128 and 3,099,644. Lower molecular weight butyl rubbers may also be prepared having $\overline{M}v$ of between about 30,000 and about 100,000. The methods of producing these low molecular weight butyl rubbers are described in U.S. Pat. 3,562,804 the corresponding chloro or bromo butyl rubbers of low molecular weight may also be prepared in conventional manner as described in U.S. Pat. 3,104,235, for example. For most purposes the low molecular weight rubbers are not used alone but are blended with the higher molecular weight rubbers in order to give a calculated averaged viscosity average molecular weight intermediate the high and low molecular weight rubbers depending upon the properties desired in the adhesives utilized.

The sulfonation using either the $SO_3$-complex described in U.S. Pat. 3,642,728 issued to Canter or the acyl sulfates described in application Ser. No. 123,908, filed Mar. 12, 1971 are carried out so as to give a final sulfo rubber containing between about 0.1 and 5.0 mole percent $SO_3H$ groups. The amounts of reactants and the reaction conditions are fully set forth in those applications and incorporated hereto by specific reference to the Canter patent and the pending application.

The thiouronium derivatives are prepared by the reaction of various thioureas with, for example, a bromobutyl rubber or a chlorobutyl rubber of the heretofore described $\overline{M}v$ ranges. See U.S. Pats. 3,033,837 and 3,037,968, which are incorporated herein by reference. The thioureas used herein, however, are limited to those containing at least one hydrogen atom attached to each nitrogen atom. The primary and secondary amino groups have been found to be desirable in producing soluble "crosslinked" rubbers of unusually high tensile strengths and of balanced hold and tack properties without the need for vulcanization after their formation. About one mol of thiourea reactant is used per gram atom of chlorine or bromine contained in the elastomer. This amounts to 0.1 to 3.5 mol percent of thiourea reactant in the final product. These compounds involve the reaction of a chloro or bromobutyl rubber with thiocarbamic acid derivatives, such as thiourea, N,N'-diethyl thiourea, N,N'-dibutyl thiourea, N,N'-diphenyl thiourea, N-ethylthiourea or mixtures thereof. Any thiourea of the general formula

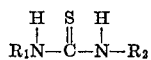

wherein $R_1$ and $R_2$ are hydrogen, $C_1$–$C_8$ alkyl or cycloalkyl may be employed.

Because of the sulfo or thiouronium groups, which are, of course, polar in nature, it is possible to ionically crosslink the various molecules and to produce an elastomeric composition of unique qualities even without vulcanization. They have some semblance of being "crosslinked" even though no vulcanization step has been employed. In general, these sulfo or thiouronium derivatives of olefinically unsaturated elastomers possess unusually high tensile strengths, creep resistance and, in the case of their use as pressure sensitive adhesive compositions, unique qualities not heretofore found in elastomeric based pressure sensitive adhesive compositions, in their balance between hold and tack properties.

Ordinarily, there are two properties which are highly desirable in pressure sensitive adhesives. One is tack where the ability of the adhesive to quickly adhere to a substrate is important and the other is holding or the ability of the adhesive to support a load under shear and/or peel stress. The techniques which are oftentimes used to enhance the tack of pressure sensitive adhesives work to the detriment of their holding power in that tackiness generally tends to produce a softer adhesive mass which exhibits insufficient hold. Conversely, techniques used to promote the holding power of a pressure sensitive adhesive tend to diminish tack. Of course, what is desirable is an optimum balance between tack and hold. This is oftentimes difficult to achieve in pressure sensitive adhesives especially those that are based on synthetic elastomers.

One of the unique features of the present invention resides in the discovery that blends or admixtures of elastomers of different viscosity average molecular weights having sulfo or thiouronium groups may be employed to produce pressure sensitives. This is particularly useful in the case of blends or admixtures of butyl rubbers or chlorobutyl rubbers. For example, the sulfonation reaction may be carried out separately on regular butyl rubber of say 375,000 to 450,000 viscosity average molecular weight and on low molecular weight butyl rubber of say 30,000 to 100,000 viscosity average molecular weight. The two sulfonated mixtures can be then blended in any desired ratio to give a final blended product of a calculated and averaged intermediate viscosity average molecular weight. Alternatively, and preferably, however, the blends of butyl rubbers or chlorinated butyl rubbers are first prepared and the blended admixture is then subjected to sulfonation or, in the case of chlorinated butyls, to reaction with thiourea or N substituted derivatives thereof. The resultant products from this type of procedure offers advantageous results as pressure sensitive adhesives. The amounts of the rubbers used may vary as between high molecular weight and low molecular weight rubbers from a ratio of about 4:1 to a ratio of about 1:4 respectively. One desirable blend, it has been found, contains about 2 parts by weight of low molecular weight rubber or halo rubber per part by weight of high molecular weight rubber or halo rubber. Other examples could be provided but these are representative of the types that are useful in practicing the present invention.

TABLE A

| Rubber blends | | $\overline{M_v}$ | Amount, weight percent | Calculated Average $\overline{M_v}$ |
|---|---|---|---|---|
| I | Chlorobutyl | 375,000 | 50 | 202,500 |
|   | Do | 30,000 | 50 |  |
| II | Butyl | 365,000 | 60 | 231,000 |
|   | Do | 30,000 | 40 |  |
| III | Chlorobutyl | 400,000 | 60 | 237,000 |
|   | Do | 30,000 | 40 |  |
| IV | Butyl | 250,000 | 50 | 175,000 |
|   | Do | 100,000 | 50 |  |
| V | Chlorobutyl | 250,000 | 60 | 162,000 |
|   | Do | 30,000 | 40 |  |
| VI | Butyl | 100,000 | 60 | 72,000 |
|   | Do | 30,000 | 40 |  |
| VII | Butyl | 450,000 | 30 | 156,000 |
|   | Do | 30,000 | 70 |  |

The chlorinated high molecular weight polymer contains at least .5, preferably at least 1.0 weight percent combined chlorine, but not more than about 2 "X" weight per cent and preferably not more than about "X" weight percent combined chlorine wherein $$X = \frac{35.46L}{(100-L)M_1 + L(M_2+35.46)} \times 100$$

and;

L = Mole percent of the multiolefin in the polymer
$M_1$ = Molecular weight of the isoolefin
$M_2$ = Molecular weight of the multiolefin
35.46 = Atomic weight of chlorine The novel pressure sensitive adhesives in one instance are prepared using as the base of the compositions the heretofore described sulfo derivatives of olefinicaly unsaturated elastomers in which the amount of sulfo groups ranges between about 0.1 and 3.5 mole percent, preferably between about 0.2 and about 1.5 mole percent. The same ranges of polar groupings apply also in the case of the preparation of the thiouronium derivatives of the halogenated olefinically unsaturated elastomers.

Normally liquid, viscous, tackifiers are employed in producing the pressure sensitive adhesives. In general, their viscosity average molecular weight will be below 60,000 and, in general, they are selected from the polyhydrocarbons such as polyolefins and polydiolefins, for example, polyisobutylenes, polybutenes, and from the solid soft resins having softening points of about 50° C., such as rosin esters, the hydrogenated methyl ester of rosin, pentaerythritol esters of rosin or of hydrogenated rosin, and similar types of resins. They are used in amounts ranging between about 10 to 150 phr. (per hundred parts of rubber) preferably between about 15 and 75 phr. Still other resinous tackifiers such as the thermoplastic solid glassy resins having softening points of above 50° C. may be used. In cases where resins are used, amounts range between about 5 and 45 phr. Further examples of the thermoplastic resins are the alkylphenolformaldehyde, phenol-formaldehyde, terpene-phenol, polyterpenes, coumarone-indene, or petroleum, resin types. Mixtures of the viscous polymers and the resinous materials are often used as the tackifier component. All of these tackifiers, as well as others also well known, are conventionally used, as such, in preparing rubbery adhesive compositions. They are used in solvents, or if viscous, alone, or in the case of resins, in molten, or solution form.

The solvents employed in forming cements of these adhesives are generally of the organic type or they are of the mixed solvent organic type in which at least one of the solvents is a polar solvent. The organic hydrocarbon type solvents may be benzene, toluene, tetrahydrofuran, hexane, heptane or other types similar to those. On the other hand, mixed solvents generally give better cements because of their polar characteristics. Such solvents as branched chain alcohols, i.e. a polar solvent or dioxane coupled with cyclohexane, benzene, toluene, hexane, heptane, or coupled with tetrahydrofuran provide excellent cements having better stability on standing. Any other suitable solvents customarily employed in forming elastomeric cements which are in fact solvents for the concentration of the sulfo or thiouronium elastomers incorporated may also be employed. For the most part this selection of the organic solvent or mixed solvents forming the cement is a matter of choice and convenience. It should be understood, however, that the solvent or mixed solvents employed do in fact possess sufficient volatility characteristics so that once a pressure sensitive adhesive cement is deposited on a substrate substantially all of the solvents can be evaporated at commonly used drying temperatures and pressures within a reasonable length of time. It is desired that the adhesive layer be substantially devoid of solvent once the adhesive has reached a static condition. In general, the cements will contain between about 10 and 30 wt. percent total solids preferably between about 15 and 25 wt. percent total solids. A preferred solvent consists of 90 parts of toluene admixed with 10 parts of isopropyl alcohol.

The sulfo elastomers employed may be incorporated into the cements in an unneutralized (acidic) form. Best results have been attained where the sulfo groups have been at least partially neutralized, preferably completely neutralized. The neutralizing agents employed may be any inorganic or organic bases such as the alkali metal or alkaline earth metal hydroxides or carbonates, for example potassium hydroxide, sodium hydroxide, calcium hydroxide or sodium carbonate, potassium carbonate, calcium or barium carbonate etc. The organic bases which are generally employed are the amines. These are either the primary, secondary or tertiary amines. They can be heterocyclic, alicyclic or aliphatic in nature and they may contain polar groups as well. Specific examples of the amines that may be employed are methylamine, dimethylamine, trimethylamine, ethylamine, diethylamine, triethylamine, n - butylamine, di-n-butylamine, tri-n-butylamine and in fact any mono-, di-, or tri ($C_1$–$C_8$ alkyl) amine. Examples of heterocyclic amines that may be employed are pyridine and piperazine. Examples of amines containing polar groups which have been found to be satisfactory for example the alkylol amines such as mono-, di-, or tri-ethanol amines and nitrilo-triacetic acid. Other amines containing other polar groups such as chlorine, carbonyl and ether groups may also be used in addition to those containing hydroxyl and carboxyl groups. It is preferred to neutralize the sulfo groups with an amine. Surprisingly improved results are attained when all of the sulfo groups have been neutralized with an amine. The thiouronium compounds need no separate neutralizing treatment. Any hydrogen halide produced will be in the form of its amine acid addition salt.

The substrates or backings to which the pressure sensitive adhesive compositions are applied in cement form may be of various porous or nonporous types and they may be organic or inorganic in nature. Most generally, these materials are those which are customarily employed in pressure sensitive tapes, either the cloth or paper-backed types or tape backings made of synthetic materials, for example, polyesters such as the copolymer of ethylene glycol with terephthalic acid, vinyls such as a copolymer of vinylidene chloride and vinyl chloride, or a copolymer of vinylidene chloride with acrylonitrile, cellophane, cellulose acetate, polyvinyl chloride, polyvinyl acetate, polypropylene, polyethylene, ethylene-propylene plastic copolymer. Sheetings and tapes of cloth or textiles of either natural or synthetic fiber origin, such as glass fiber cloth, wood, and finally sheets or strips of metals such as steel, copper, aluminum, and alloys thereof can also be employed. In general, the backings employed are those which have been heretofore been conventionally employed in preparing pressure sensitive labels, tapes, sheetings and the like and the selection of any particular substrate material is not a specific novel feature of the present invention.

Sufficient cement of the above specified total solids concentration is applied to the substrate in order that, upon drying, i.e. the vaporization of the solvent vehicle, it will leave an adhesive composition or film on the substrate varying in thickness from about 0.5 to about 3.0 mils preferably between about 1 and about 2 mils, dry thickness.

In conducting the various runs and preparing the various examples for testing as hereinafter more fully described, certain standard tests accepted in the industry have been employed. These tests are well known and do not form any part of the present invention. They will, however, be briefly referred to for the purpose of completeness.

The 178° vertical hold test is a standard test described as "Pressure Sensitive Council Test Method PSTC–7." This test is also known as the hold power or shear adhesive test and designed as a measurement of vertical creep resistance. This consists of suspending a 400 gram weight from a ½" wide strip of tape adhered to a ½" wide steel bar by means of the adhesive composition being tested. The time that the adhesive can support this load is then measured and then recorded. This test measures resistant to creep, a desirable property of pressure sensitive adhesives Additionally, a 20° hold test is used in some of the following tests. It is, in effect, a modification of the previously described vertical hold test wherein the steel bar to which the presure sensitive adhesive is adhered is inclined 20° from the vertical. This places a complex shear and peeling force on the adhesive. Again, a 400 gram weight is suspended by a ½" strip and the time to failure is measured.

A 180° peel adhesion standard test was also carried out in some instances. It is designated as PSTC–1. This test consists of peeling a strip of plastic film substrate coated with the pressure sensitive adhesive composition being tested away from a steel panel at the rate of 12" per minute. The results are expressed in lbs. or ounces per inch of width of coated film substrate.

A rolling ball tack test, designated PSTC–6, is also used. This consists of rolling a small steel ball down a standardized incline and then across the pressure sensitive adhesive film. The distance the standardized ball rolls, in inches, across the adhesive from the base of the incline is measured. Very tacky adhesives will quickly stop the ball and the inches of roll will be very small. The lower the number the greater the degree of tack.

The Polyken Probe Tack test is designated as ASTM Method D–1878–61. This test consists of contacting a steel probe having a polished surface with the pressure sensitive adhesive film in a direction normal to the plane of the adhesive film. The contact pressure and dwell time are controlled as well as the speed of separation. The force required to pull the probe from the adhesive surface is measured.

A desirable pressure sensitive adhesive composition should have high 20° and 178° hold readings while having low rolling ball tack numbers. As a practical matter, the best pressure sensitive adhesive compositions, as before stated, are usually a compromise between high hold and low tack properties and low hold and high tack properties.

EXAMPLE 1

A cement of normal hexane containing 14.2 wt. percent of butyl rubber of $\overline{M}v$ 350,000 in 3 liters is reacted with 16.48 cc. of an acetyl sulfate solution, made by reacting 23.4 cc. of acetic anhydride with 11 cc. of 96% sulfuric acid. This solution was then fully neutralized with 70% aqueous ethylamine. The polymers were recovered from the solution by isopropyl alcohol precipitation as crumb rubber. This crumb was then dissolved in a 90% toluene 10% isopropyl alcohol solvent. To 100 parts of the sulfobutyl rubber (1.5 mol percent sulfo groups) in the aforementioned cement tackifiers were added consisting of 45 parts of Wingtack 95, a petroleum hydrocarbon resin of polymerized olefins and diolefins having a ball and ring softening point of 95° C., and 15 parts per 100 parts of sulfobutyl rubber of Aroclor 1254, a liquid chlorinated polyphenyl.

Additionally, an unsulfonated butyl rubber was compounded with the same amounts of the same mixture of tackifiers for comparative purposes. The comparable results are given below.

TABLE I.—COMPARISON OF SULFOBUTYL WITH BUTYL

|  | I | IA |
|---|---|---|
| Compounds |  |  |
| Sulforbuytl, 1.5 mol. percent fully neutralized | 100 |  |
| Butyl $\overline{M}v$ 350,000 |  | 100 |
| Wingtack 95, hydrocarbon resin | 45 | 45 |
| Aroclor 1254, chlorinated polyphenyl | 15 | 15 |
| Properties: |  |  |
| 178° vertical hold, minutes (½" x ½" contact area, 400 g. load) | >4,300 | 110 |
| 20° hold, minutes (½" x ½" contact area, 400 g. load) | 3.0 | 0.3 |
| 180° peel adhesion, oz./in. (to steel at 12"/min.) | 64 | 72 |
| Rolling ball tack, inches (low values desirable) | 18 | 18 |
| Polyken probe tack, g./cm.$^2$ (1 second dwell, 100 g./cm.$^2$ pressure, 1 cm./sec. pull) | 250 | 1,000 |

From the above it can be seen that excellent 178° vertical hold properties were attained using the neutralized sulfobutyl rubber pressure sensitive adhesive as opposed to the poor hold of the butyl rubber composition, even though the rolling ball tack was about the same, in both cases.

EXAMPLE 2

The same sulfobutyl rubber as produced in Example 1, fully neutralized with ethylamine, was compounded with various tackifiers for comparative purposes. The same cements as prepared in Example 1 were prepared in this case and the same tests were carried out in order to determine the effect of using various tackifiers.

EXAMPLE 4

To a butyl cement 1600 gm. (18 wt. percent) in hexane containing 288 g. of butyl rubber ($\overline{M}v$ 375,000) was added 576 gm. of L.M. butyl ($\overline{M}v$ 30,000). To the cement was added 36.9 cc. of acetyl sulfate. The acetyl sulfate was prepared by adding 22 cc. of (96%) sulfuric acid to 46.8 cc. of acetic anhydride. The reaction was allowed to proceed for 20 minutes in the hexane solution. The solution was then fully neutralized with 47.9 grams of 70% aqueous ethylamine. The sulfonated and neutralized polymer was then recovered by isopropyl alcohol precipitation. The crumb polymer recovered was then dissolved in a solution of 90 parts toluene and 10 parts isopropyl alcohol at a concentration of 25 wt. percent solids. No additional tackifiers were employed. A series of 5 runs were carried out in runs B through E using varying amounts as shown of high and low molecular weight butyl rubbers, the actual mole percent sulfonation was about 1.5 where 2.0% is shown and in the other runs, the actual mole percent sulfonation was about .75 (about 1.0% being shown).

Table IV shows the results of the series of runs and the tests carried out. From these data it can be seen that by using proper blend ratios of high and low molecular weight butyl rubber polymers in conjunction with a controlled level of sulfonation, butyl based pressure sensitive adhesives can be made which exhibit high 20° hold.

TABLE IV

|  | A | B | C | D | E |
|---|---|---|---|---|---|
| Butyl $\overline{M}v$ 375,000 | 100 | 100 | 100 | 100 | 100 |
| Butyl $\overline{M}v$ 30,000 | 200 | 200 | 250 | 300 | 300 |
| Sulfonation level, mol percent, about | 1 | 2 | 1 | 1 | 2 |
| Polyken tack, g./cm.$^2$ (per ASTM D-1878-61, 100 g./cm. load, 1 second dwell, 1 cm./sec. pull) | 90 | 70 | ----- | 600 | 30 |
| 20° hold, minutes | 120 | 1 | 12 | 2 | 1 |

TABLE II

| Compounds: |  |  |  |  |  |  |  |
|---|---|---|---|---|---|---|---|
| Sulfobutyl, 1.5 mol percent SO₃H fully neutralized | 100 | 100 | 100 | 100 | 100 | 100 | 100 |
| Wingtack 95, hydrocarbon resin | 35 | 40 | 45 |  |  |  |  |
| Aroclor 1254, chlorinated polyphenyl | 15 | 15 | 15 |  |  |  |  |
| Vistanex LM-MS polyisobutylene |  |  |  | 40 | 50 | 60 |  |
| Indopol H-1900, polybutene |  |  |  |  |  |  | 50 |
| Properties: |  |  |  |  |  |  |  |
| 178° vertical hold, minutes (½" x ½" contact area, 400 g. load) | >1,440 | >1,440 | >1,440 |  | >1,440 |  | >1,440 |
| 20° hold, minutes (½" x ½" contact area, 400 g. load) | >1,440 | >1,440 | 3.0 | 28 | 60 | 1.8 | 0.3 |
| 180° peel adhesion, oz./in. (to steel at 12"/min.) | 48 | 56 | 64 |  | 56 |  | 19 |
| Rolling ball tack, inches (lower values desirable) | >14 | >14 | >14 | 9.5 | 7.5 | 9.0 | 1.4 |
| Polyken probe tack, g./cm.$^2$ (1 second dwell, 100 g./cm.$^2$ pressure, 1 cm./sec. pull) | 500 | 600 | 250 | 250 | 100 | 300 | 300 |

Table II shows that resin type tackifiers such as hydrocarbon resins enhanced hold but yield poor rolling ball tack, while the polymeric hydrocarbon type plasticizers enhanced rolling ball tack but detract from 20° hold. In either case, however, the 178° vertical hold or creep resistance is good.

EXAMPLE 3

This example represents the data obtained using a variety of sulfonated butyls with varying degrees of sulfonation, some unneutralized, some partially neutralized, and some fully neutralized, blended with two different tackifier systems. It is apparent that the higher sulfonation levels of the sulfobutyl rubbers, being fully neutralized with ethylamine, produced the more advantageous pressure sensitive adhesive properties.

TABLE IV-A

|  | A | B | C | D |
|---|---|---|---|---|
| Butyl $\overline{M}$- 375,000 | 100 | 100 | 100 | 100 |
| Butyl $\overline{M}v$ 30,000 | 200 | 200 | 250 | 250 |
| Sulfonation level, mol percent, about | 1 | 0.75 | 1 | 0.75 |
| Polyken tack, g./cm.$^2$ | 750 | 800 | 750 | 600 |
| 20° hold, minutes | 4 | 50 | 7 | 6 |

In Table IV-A the high molecular weight butyl rubber had about the same molecular weight, namely $\overline{M}v$ 375,000, as that material used in Table IV. The sulfonating agent was the same as in Example 4 and it was used to the extent of the level of sulfonation actually shown in Table IV-A. These results further refined those presented in Table IV. Using a 2:1 wt. ratio blend of

TABLE III

| Compounds: |  |  |  |  |  |  |
|---|---|---|---|---|---|---|
| Sulfobutyl, 1.5 mol percent, fully neutralized | 100 |  |  |  | 100 |  |
| Sulfobutyl, 0.82 mol percent, fully neutralized |  | 100 |  |  |  |  |
| Sulfobutyl, 0.38 mol percent, fully neutralized |  |  | 100 |  |  |  |
| Sulfobutyl, 1.5 mol percent partially neutralized |  |  |  | 100 |  |  |
| Sulfobutyl, 1.5 mol percent unneutralized |  |  |  |  |  | 100 |
| Polybutene (Indopol H-1900) | 50 | 50 | 50 |  |  |  |
| Hydrocarbon resin (Wingtack 95) |  |  |  | 40 | 40 | 40 |
| Chlorinated polyphenyl (Aroclor 1254) |  |  |  | 15 | 15 | 15 |
| Properties: |  |  |  |  |  |  |
| 178° vertical hold, minutes (½" x ½" contact area, 400 g. load) | >1,440 | >1,440 | >1,440 | >1,440 | >1,440 | 38 |
| 20° hold, minutes (½" x ½" contact area, 400 g. load) | 0.3 | 1.6 | 3.4 | >1,440 | 1.4 | 12 |
| 180° peel adhesion, oz./in. (to steel at 12"/min.) | 19 | 23 | 38 | 40 | 21 | 38 |
| Rolling ball tack, inches (low values desirable) | 1.4 | 2.5 | 2.3 | >12 | >12 | >12 |
| Polyken probe tack, g./cm.$^2$ (1 second dwell, 100 g./cm.$^2$ pressure, 1 cm./sec. pull) | 300 | 270 | 480 | 450 | 750 | 150 | low molecular weight butyl of $\overline{M}v$ of about 30,000 to high molecular weight butyl rubber and sulfonating this blend in the manner previously described to about 0.75 mole percent yielded a pressure sensitive adhesive with good tack as measured by the Polyken test as well as a good 20° hold (IV-A-B).

EXAMPLE 5

A blend of high molecular weight butyl rubber with low molecular weight butyl rubber in the ratio of 1 part of high with 2 parts of low was sulfonated as shown in Example 4 but with a lesser amount of sulfonation agent. The solvent was then displaced with an equal amount of 90% toluene—10% isopropanol to a wt. percent solids concentration of 13.6. The sulfobutyl rubber blend contained about 0.49 mol percent sulfo groups and was then fully neutralized with ethylamine. It was placed on a substrate of polyester film to the extent of about 2 mils dry film thickness and subjected to the various tests hereinbefore described with the following results.

Rolling ball tack _____ 3.5 inches.
20° hold _____ 3 to 20 hours.
178° hold _____ >20 hours.
180° peel from steel at 12″ per minute _____ 1.25 pounds per inch width.
180° peel from glass at 12″ per minute _____ 2.0 pounds per inch width.

The same cement was additionally tested by adding to the cement, a polybutene tackifier of $\overline{M}v$ about 3200 in the amount of 15 phr. and that cement was then placed on a substrate of polyester film to the extent as herebefore noted of about 2 mils dry film thickness and again subjected to the same tests as described in the preceding paragraph with the following results:

20° hold _____ 1 to 3 hours.
178° hold _____ 3 to 20 hours.
180° peel from metal ____ 1.75 pounds per inch width.
180° peel from glass ____ 1.5 pounds per inch width.

In both sets of tests, it can readily be seen that there is a good balance between the hold and tack properties of both of these formulations and from the 178° vertical hold test it can be seen that these dried films of sulfobutyl rubber blend provided excellent creep resistance, the vertical hold tests being the tests that determine the degree of creep resistance.

EXAMPLE 6

N,N'-diethyl thiourea was reacted by dry blending with a blend of chlorobutyl rubber having an $\overline{M}v$ of about 375,000 and of chlorobutyl rubber of about $\overline{M}v$ 30,000 using various ratios of low molecular weight chlorobutyl rubber per 100 parts of high molecular weight chlorobutyl rubber. One mole of the diethyl thiourea per gram atom of chlorine present in the blend was reacted. The dry mixing took place for 50 minutes at 300° F. in a Brabender mixing chamber and some light plasticizer oil of a naphthenic nature was added in some of the runs, as shown, in Table V. Di(tridecyl) phthalate was used as a solvent and plasticizer for the thiourea. The use of this solvent improved the dispersion of the thiourea in the dry polymer blend and since the phthalate was somewhat polar in nature it also served to stabilize the resultant thiouronium salts.

Films of this reacted admixture at a 25 wt. percent concentration in 90 toluene-10 isopropanol were then applied to a substrate of polyethylene glycol-terephthalic acid (Mylar) ester resin film (1.5 mils, dry thickness) and the hold and tack properties of the pressure sensitive adhesive film were determined with the following results:

TABLE V.—BLENDS OF CHLOROBUTYL RUBBER THIOURONIUM SALTS

| Example 6 | 6-0 | 6-1 | 6-2 | 6-3 | 6-4 | 6-5 | 6-6 | 6-7 | 6-8 |
|---|---|---|---|---|---|---|---|---|---|
| Chlorobutyl $\overline{M}v$ (375,000) | [1]100 | 100 | 100 | 100 | 100 | 100 | 100 | 100 | 100 |
| Chlorobutyl $\overline{M}v$ (30,000) | 50 | 50 | 50 | 125 | 125 | 125 | 200 | 200 | 200 |
| Naphthenic oil | | 25 | 50 | | 25 | 50 | | 25 | 50 |
| N,N'-diethyl thiourea [2] | 7.3 | 7.3 | 7.3 | 9.1 | 9.1 | 9.1 | 10.4 | 10.4 | 10.4 |
| Ditridecyl phthalate | 7.3 | 7.3 | 7.3 | 9.1 | 9.1 | 9.1 | 10.4 | 10.4 | 10.4 |
| Pressure sensitive adhesive properties: | | | | | | | | | |
| 20° hold, minutes (½″ x ½″ contact area, 400 gram load) | 190 | 31 | 2 | 25 | 3 | 1 | 9 | 4 | 2 |
| Rolling ball tack, inches (low values desirable) | 7.0 | 4.0 | 0.5 | 6.5 | 2.0 | 2.0 | 5.3 | 2.5 | 2.8 |

[1] Parts by weight are used in compositions, supra.
[2] Thiourea concentration is based on one mole per gram-atom of chlorine in the blend of high and low molecular weight chlorinated butyl rubbers.

Good 20° hold values were obtained with a blend ratio of 2:1 high to low molecular weight chlorobutyl. Plasticization with the process oil diminished these hold values.

EXAMPLE 7

Following the same procedure as outlined in Example 6, further blends were made up and tested as in Example 6, for 20° hold and tack properties but, in this example, the comparison is between blends of high and low molecular weight chrorobutyl rubbers reacted with the N,N'-diethyl thiourea compared with blends of the thiouronium salt of high molecular weight chlorobutyl rubber with an unmodified polyisobutylene tackifier of about the same viscosity average molecular weight (30,000) as the low molecular weight chlorobutyl rubber. Additionally, a small amount of polybutene tackifier (10 phr.) of a molecular weight of about $\overline{M}v$ 3200 was also employed.

TABLE VI.—EFFECT OF MIX TIME ON BLENDS OF HIGH AND LOW Mv CHLOROBUTYL RUBBER THIOURONIUM SALTS

| Example 7 | 7-0 | 7-1 | 7-2 | 7-3 | 7-4 | 7-5 |
|---|---|---|---|---|---|---|
| Chlorobutyl $\overline{M}v$ (375,000) | 100 | 100 | 100 | 100 | 100 | 100 |
| Chlorobutyl $\overline{M}v$ (30,000) | 50 | 50 | 50 | | | |
| Polyisobutylene $\overline{M}v$ (30,000-40,000) | | | | 50 | 50 | 50 |
| Polybutene $\overline{M}v$ (3,200) | 10 | 10 | 10 | 10 | 10 | 10 |
| N,N'-diethyl thiourea | 6.5 | 6.5 | 6.5 | 6.5 | 6.5 | 6.5 |
| Ditridecyl phthalate | 6.5 | 6.5 | 6.5 | 6.5 | 6.5 | 6.5 |
| Thiourea concentration in mols/gram atom Cl | 1 | 1 | 1 | 1 | 1 | 1 |
| Brambley kneader mix time, minutes (with steam on, ~230° F.) | 5 | 15 | 45 | 5 | 15 | 45 |
| Pressure sensitive adhesive properties: | | | | | | |
| 20° hold, minutes (½″ x ½″ contact area, 400 gram load) | 1 | 18 | 56 | 0 | 0 | 1 |
| Rolling ball tack, inches (low values desirable) | 0.7 | 1.3 | 2.0 | 2.5 | 1.0 | 1.5 |

In order to enhance 20° hold while exhibiting excellent tack, the low molecular weight, e.g. low molecular weight chlorobutyl rubber, must be capable of chemical interaction with the high molecular weight rubber. Simple plasticization with a polymer of similar low molecular weight, e.g. polyisobutylene, but which does not have appropriate functionality to interact with the high molecular weight rubber does not improve the 20° hold at similar levels of tack.

EXAMPLE 8

High molecular weight chlorobutyl rubber of $\overline{M}v$ 375,000 and containing about 1.7 wt. chlorine, reacted with about 1 mol per gram atom of chlorine in the rubber of N,N'-diethyl thiourea for about 5 minutes at 270° F. was compared as a base polymer for pressure sensitive adhesives with polyisobutylene of about $\overline{M}v$ 1,700,000 and with sulfonated butyl rubber of $\overline{M}v$ 375,000. Adhesives coated onto polyester film were evaluated for creep resistance, tack and hold, using a dry adhesive film thickness of about 1.5 mils. The following Table VII illustrate the comparative data obtained.

Having now thus fully described and illustrated the present invention, what is desired to be secured by Letters Patent is:

1. Pressure sensitive adhesive compositions comprising thiouronium derivatives of olefinically unsaturated elastomers containing between about 0.1 and about 3.5 mol percent of thiouronium groups, at least one tackifier in the amount of between about 10 and about 150 parts per hundred parts of elastomer and dissolved in an organic volatile solvent or mixture of organic solvents.

2. Adhesive compositions as in claim 1 wherein a combination of tackifiers is employed and wherein one component thereof is a normally liquid viscous polyhydrocarbon having a viscosity average molecular weight of TABLE VII.—EVALUATION OF CHLOROBUTYL THIOURONIUM SALTS IN PRESSURE SENSITIVE ADHESIVES

| Example 8 | 8-1 | 8-2 | 8-3 | 8-4 | 8-5 | 8-6 | 8-7 | 8-8 | 8-9 | 8-10 | 8-11 |
|---|---|---|---|---|---|---|---|---|---|---|---|
| Vistanex $\overline{M}v$ (1,700,000) | 100 | | | | | | | | | | |
| Butyl [1] $\overline{M}v$ 375,000 | | 100 | 100 | | | | | | | | |
| Chlorobutyl ($\overline{M}v$ 375,000) | | | | 100 | 100 | 100 | 100 | 100 | 100 | 100 | 100 |
| Diethyl thiourea | | | | | | 4.6 | 4.6 | 4.6 | 4.6 | 4.6 | 4.6 |
| Ditridecyl phthalate | | | | | | 4.6 | 4.6 | | 4.6 | 4.6 | 4.6 |
| Polybutene [2] $\overline{M}v$ (7,000–8,000) | 30 | 50 | 75 | 30 | 50 | 15 | 30 | 30 | 45 | 50 | 75 |
| Pressure sensitive adhesive properties: [3] | | | | | | | | | | | |
| 178° vertical hold, minutes (½" x ½" contact area 400 gram load) | 160 | >1,440 | 300 | 115 | 0.1 | >1,440 | >1,440 | >1,440 | 304 | 90 | 70 |
| Rolling ball tack, inches (low values desirable) | 2.5 | 1.4 | 2.0 | 2.3 | 0.5 | 3.3 | 2.3 | 3.0 | 1.8 | 1.3 | 1.0 |

[1] Butyl rubber feed stock sulfonated to 1.5 mol percent and fully neutralized with ethylamine.
[2] Polybutene concentrations are in parts per hundred of modified polymer, not parts per hundred chlorobutyl, except for the controls.
[3] Pressure sensitive adhesive properties were determined by coating cements to a 1.5 mil dried adhesive film thickness onto polyester film.

Excellent creep resistance as indicated by high 178° vertical hold values can be obtained using butyl rubber with either sulfo groups or thiouronium groups. The thiouronium salts of the chlorinated butyl, however, can tolerate slightly less added tackifier when maintaining the same degree of hold.

EXAMPLE 9

Further studies were undertaken to determine the best ratios of amounts of low and high molecular weight chlorinated butyl rubber together with small amounts of tackifiers and plasticizers to achieve the best balance of tack and 20° hold properties for pressure sensitive adhesive compositions involving the use of thiouronium salts of the chlorobutyl rubber blends. The following comparative data were obtained below 60,000 and another component thereof is a resinous material having a softening point above 50° C.

3. Adhesive compositions as in claim 1 wherein the thiouronium groups are present in an amount between about 0.2 and about 1.5 mol percent.

4. Adhesive compositions as in claim 1 wherein one tackifier is a normally liquid viscous polyhydrocarbon having a viscosity average molecular weight of below 60,000.

5. Pressure sensitive adhesive compositions coated onto a substrate and having balanced hold and tack properties, with resistance to cold flow wherein the adhesive coating, of a thickness between about 1.0 and about 2.5 mils, is a thiouranium derivative of olefinically unsaturated elastomers containing between about 0.1 and about 3.5 mol TABLE VIII.—BLENDS OF HIGH AND LOW $\overline{M}v$ CHLOROBUTYL RUBBER THIOURONIUM SALTS

| Example 9 | 9-0 | 9-1 | 9-2 | 9-3 | 9-4 | 9-5 | 9-6 | 9-7 | 9-8 | 9-9 | 9-10 | 9-11 |
|---|---|---|---|---|---|---|---|---|---|---|---|---|
| Chlorobutyl $\overline{M}v$ (375,000) | 100 | 100 | 100 | 100 | 100 | 100 | 100 | 1000 | 100 | 100 | 100 | 100 |
| Chlorobutyl $\overline{M}v$ (30,000) | 40 | 50 | 60 | 40 | 50 | 60 | 40 | 50 | 60 | 50 | 40 | 40 |
| Polybutene $\overline{M}v$ (3,200) | | | | 10 | 10 | 10 | 20 | 20 | 20 | 10 | | 10 |
| N,N'-diethyl thiourea | 5.8 | 6.2 | 6.4 | 5.8 | 6.2 | 6.4 | 5.8 | 6.2 | 6.4 | 6.2 | 5.8 | 5.8 |
| Ditridecyl phthalate | 5.8 | 6.2 | 6.4 | 5.8 | 6.2 | 6.4 | 5.8 | 6.2 | 6.4 | | | |
| Brookfield viscosity, cps. (at 25 wt. percent solids in 90/10 toluene/IPA | 4,500 | 3,000 | 3,500 | 3,300 | 2,400 | 1,600 | 1,800 | 1,600 | 2,600 | 2,750 | 4,950 | 3,300 |
| Pressure sensitive adhesive properties: | | | | | | | | | | | | |
| 178° vertical hold, minutes (½" x ½" contact area, 400 gram load) | 35 | 75 | 190 | 56 | 24 | 60 | 2 | 4 | 55 | 45 | 5 | 4 |
| 20° hold, minutes (½" x ½" contact area, 400 gram load) | 6 | 15 | 17 | 125 | 27 | 3 | 0 | 1 | 140 | 1 | 2 | 1 |
| Rolling ball tack, inches (low values desirable) | 1.5 | 1.5 | 1.8 | 2.0 | 1.8 | 1.8 | 1.3 | 1.3 | 4.0 | 2.5 | 3.0 | 1.3 |

NOTE.—All compounds were mixed in a Bramley kneader for 45 minutes with the steam at about 230° F.

The results show that the best balance of pressure sensitive adhesive properties are set forth as run 9–3 and that only relatively minor amounts of low $\overline{M}v$ chlorobutyl rubber and of added tackifier (polybutenes) are sufficient to improve the tack and 20° hold balance.

percent of sulfo or thiouronium groups, and at least one tackifier in the amount of between about 10 and about 150 parts per hundred parts of elastomer deposited from a cement of an organic volatile solvent or mixture of organic volatile solvents.

6. A composition as in claim 5 wherein a sheet or film substrate is selected from the group consisting of cellophane, $C_2$–$C_3$ monoolefin polymers and copolymers, cellulose acetate, paper, cloth, polyvinyl chloride, copolymer of ethylene glycol and terephthalic acid, polyvinyl acetate, copolymer of vinylidene chloride and vinyl chloride, polyvinylidene chloride, copolymer of vinylidene chloride with acrylonitrile, wood and metals.

7. A composition as in claim 5 wherein a combination of tackifiers is employed and wherein one component thereof is a normally liquid viscous polyhydrocarbon having a viscosity average molecular weight of below 60,000 and another component thereof is a resinous material having a softening point above 50° C.

8. A composition as in claim 5 wherein the coating contains a blend of high and low molecular weight thiouronium butyl rubbers and wherein the calculated averaged $\bar{M}v$ is between about 150,000 and about 250,000.

References Cited

UNITED STATES PATENTS

| | | | |
|---|---|---|---|
| 3,642,728 | 2/1972 | Canter | 260—41.5 A |
| 3,033,837 | 5/1962 | Minckler et al. | 260—83.1 |
| 3,037,968 | 6/1962 | Cottle et al. | 260—79.5 R |

OTHER REFERENCES

Morton: Introduction to Rubber Technology, Reinhold, New York, (1959), pp. 355 and 358–360.

Damusis: Sealants, Reinhold, New York (1967), pp. 308–310.

MORRIS LIEBMAN, Primary Examiner

H. H. FLETCHER, Assistant Examiner

U.S. Cl. X.R.

117—133, 138.8 E F UA, 146, 148, 155 U A; 260— 27 BB, 30.4 A, 33.6 A, AQ, 79.3 R, 846, 888

UNITED STATES PATENT OFFICE
CERTIFICATE OF CORRECTION

Patent No. 3,801,531　　　　　　　　　Dated April 2, 1974

Inventor(s) Anthony J. Berejka and Leonard H. Drexler

It is certified that error appears in the above-identified patent and that said Letters Patent are hereby corrected as shown below:

> In the claims, cancel the term "sulfo or" which appear in claim 5 at column 12, line 71.

Signed and Sealed this seventh Day of October 1975

[SEAL]

Attest:

RUTH C. MASON
*Attesting Officer*

C. MARSHALL DANN
*Commissioner of Patents and Trademarks*